«12» United States Patent
Schlesener et al.

(10) Patent No.: US 8,121,028 B1
(45) Date of Patent: Feb. 21, 2012

(54) QUALITY OF SERVICE PROVISIONING FOR PACKET SERVICE SESSIONS IN COMMUNICATION NETWORKS

(75) Inventors: Matthew C. Schlesener, Olathe, KS (US); Pallavur Sankaranaraynan, Overland Park, KS (US); Brian D. Mauer, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 989 days.

(21) Appl. No.: 11/324,671

(22) Filed: Jan. 3, 2006

(51) Int. Cl.
    *H04L 12/28* (2006.01)
(52) U.S. Cl. ...................................... 370/230
(58) Field of Classification Search ............... 370/234, 370/254, 392, 465; 709/238, 245, 223, 227, 709/228; 713/182; 725/109, 111
    See application file for complete search history.

(56) References Cited

U.S. PATENT DOCUMENTS

| 6,374,302 | B1 * | 4/2002 | Galasso et al. | 709/238 |
| 7,035,260 | B1 * | 4/2006 | Betta et al. | 370/392 |
| 7,447,780 | B2 * | 11/2008 | McMahon et al. | 709/227 |
| 7,631,325 | B2 * | 12/2009 | Rys et al. | 725/25 |
| 2002/0101860 | A1 * | 8/2002 | Thornton et al. | 370/352 |
| 2003/0095510 | A1 * | 5/2003 | Dorenbsoch | 370/260 |
| 2003/0167343 | A1 * | 9/2003 | Furuno | 709/244 |
| 2004/0249927 | A1 * | 12/2004 | Pezutti | 709/223 |
| 2004/0261116 | A1 * | 12/2004 | Mckeown et al. | 725/109 |
| 2005/0091505 | A1 * | 4/2005 | Riley et al. | 713/182 |
| 2005/0226230 | A1 * | 10/2005 | Dorenbosch | 370/352 |
| 2006/0072523 | A1 * | 4/2006 | Richardson et al. | 370/338 |
| 2006/0149845 | A1 * | 7/2006 | Malin et al. | 709/228 |
| 2006/0198334 | A1 * | 9/2006 | Civanlar et al. | 370/328 |
| 2006/0274730 | A1 * | 12/2006 | Medlock et al. | 370/352 |
| 2007/0008885 | A1 * | 1/2007 | Bonner | 370/230 |
| 2007/0168466 | A1 * | 7/2007 | Tooley et al. | 709/218 |
| 2007/0201409 | A1 * | 8/2007 | Kandlur et al. | 370/338 |
| 2008/0247382 | A1 * | 10/2008 | Verma et al. | 370/352 |

* cited by examiner

*Primary Examiner* — Chi Pham
*Assistant Examiner* — Mohammad Adhami

(57) ABSTRACT

A communication system comprises an end system coupled to an access system and configured to transmit an invite message for a session wherein the invite message indicates a destination and an alias for the end system, a proxy system configured to receive the invite message and transfer a quality request wherein the policy request indicates the alias, a policy system configured to receive the quality request, determine a quality level for the session and transmit a quality message to the access system indicating the alias and the quality level, and the access system configured to receive the quality message, transmit a query to a database system indicating the alias, receive a network address for the end system in response to the query, identify traffic for the session using the network address, and apply the quality level to the traffic.

4 Claims, 8 Drawing Sheets

QUALITY OF SERVICE PROVISIONING FOR PACKET SERVICE SESSIONS IN COMMUNICATION NETWORKS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to packet services in communication networks, and in particular, to the provisioning of quality of service levels for service sessions.

2. Description of the Prior Art

Recently, cable companies have begun to offer voice services in addition to the standard data and entertainment services of the past. The most common voice service offered is voice over packet (VoP), of which Voice over Internet Protocol (VoIP) is a well known example. Cable companies that offer multiple types of services are often times referred to as multi-system operators, or MSOs.

End users, such as residential and business customers, are accustomed to high levels of quality of service (QoS) from circuit switched voice providers, such as the local exchange carriers (LECs) that form portions of the public switched telephone network (PSTN). In order to compete with circuit switched voice providers, MSOs must be able to provide QoS at comparable levels.

FIG. 1 illustrates a communication network 100 in the prior art for providing QoS in a cable MSO network. Communication network 100 includes cable network 110, access system 105, destination system 120, end system 101, proxy system 112, and policy decision function (PDF) system 111. In communication network 110, cable network 110 provide transport for communications between access system 105 and destination system 120. Access system 105 provides end system 101 with access to cable network 110. End system 101 is typically connected to access system 105 by a hybrid fiber/coaxial connection (HFC). Cable network 110 is often times a high-speed Ethernet network, such as Gig-Ethernet. Proxy system 112 is typically a session initiation protocol (SIP) proxy system. Likewise, end system 101 could include a SIP end device. Proxy system 112 operates in accordance with well known protocols, such as SIP).

In operation, end system 101 registers with proxy system 112, including transmitting the network address of end system 101, such as its IP address, to proxy system 112. Proxy system 112 stores the current network address of end system 101 for later call processing.

FIG. 2 illustrates the operation of communication network 100 for provisioning QoS for a VoP session between end system 101 and destination system 120 in an example of the prior art. To begin, end system 101 transmits a SIP invite message to proxy system 112. The invite message indicates an identifier for end system 101 and a destination identifier for destination system 120. Proxy system 112 typically processes the invite message to perform call setup processes to setup a VoP call between end system 101 and destination system 120. As part of the call setup process, proxy system 112 transmits a QoS request to PDF system 111. The request indicates the network address for end system 101. In response, PDF system 111 looks up the requested QoS information and transmits the resulting QoS information to access system 105. Access system 105 configures the links between end system 101 and access system 105 in accordance with the QoS information. The appropriate QoS level is then applied to the VoP session between end system 101 and destination system 120.

One prior problem illustrated by FIG. 2 is that the current network address of end system 101 is required by PDF system 111 and access system 105 in the QoS provisioning process. In many cases, MSOs partner with third-party carriers to provide VoP services to the MSO customers. However, common boundary devices, such as session border controllers, block actual network addresses from passing across peered network borders. As a result, MSOs face increasing challenges in their attempts to provide high levels of QoS to customers who have become accustomed to the high QoS of the PSTN. In addition, carriers face increased challenges to their ability to provide QoS control over sessions originating from or terminating to a peered MSO network due to the presence of session border controllers.

SUMMARY OF THE INVENTION

An embodiment of the invention helps solve the above problems and other problems by providing systems and methods that allow a carrier network to retain call control over sessions originating from or terminating to a peered MSO network, even though visibility across the networks is reduced due to the presence of session border controllers.

In an embodiment of the invention, a communication system comprises an end system coupled to an access system and configured to transmit an invite message for a session wherein the invite message indicates a destination and an alias for the end system, a proxy system configured to receive the invite message and transfer a quality request wherein the policy request indicates the alias, a policy system configured to receive the quality request, determine a quality level for the session and transmit a quality message to the access system indicating the alias and the quality level, and the access system configured to receive the quality message, transmit a query to a database system indicating the alias, receive a network address for the end system in response to the query, identify traffic for the session using the network address, and apply the quality level to the traffic.

In an embodiment of the invention, the access system comprises a cable modem termination system (CMTS).

In an embodiment of the invention, the end system comprises a device coupled to a modem.

In an embodiment of the invention, the network address is a dynamic Internet Protocol (IP) address for the modem.

In an embodiment of the invention, the alias comprises a hard coded domain name service (DNS) name for the modem.

In an embodiment of the invention, the database system comprises a domain name service (DNS) server.

In an embodiment of the invention, the session comprises a voice over Internet Protocol (VoIP) session.

BRIEF DESCRIPTION OF THE DRAWINGS

The same reference number represents the same element on all drawings.

DETAILED DESCRIPTION OF THE PREFERRED EMBODIMENT

FIGS. 3-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
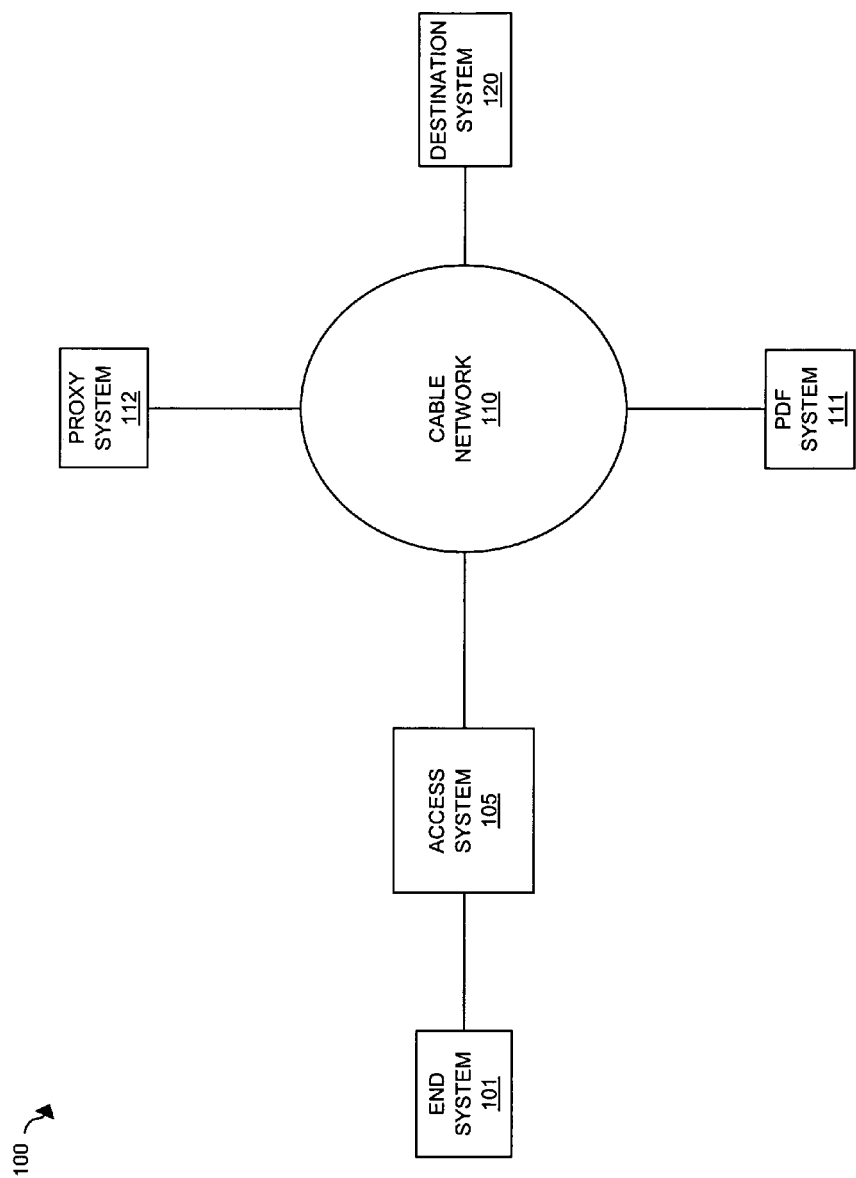
FIG. 1 illustrates a communication network in an example of the prior art.
Figure 2:
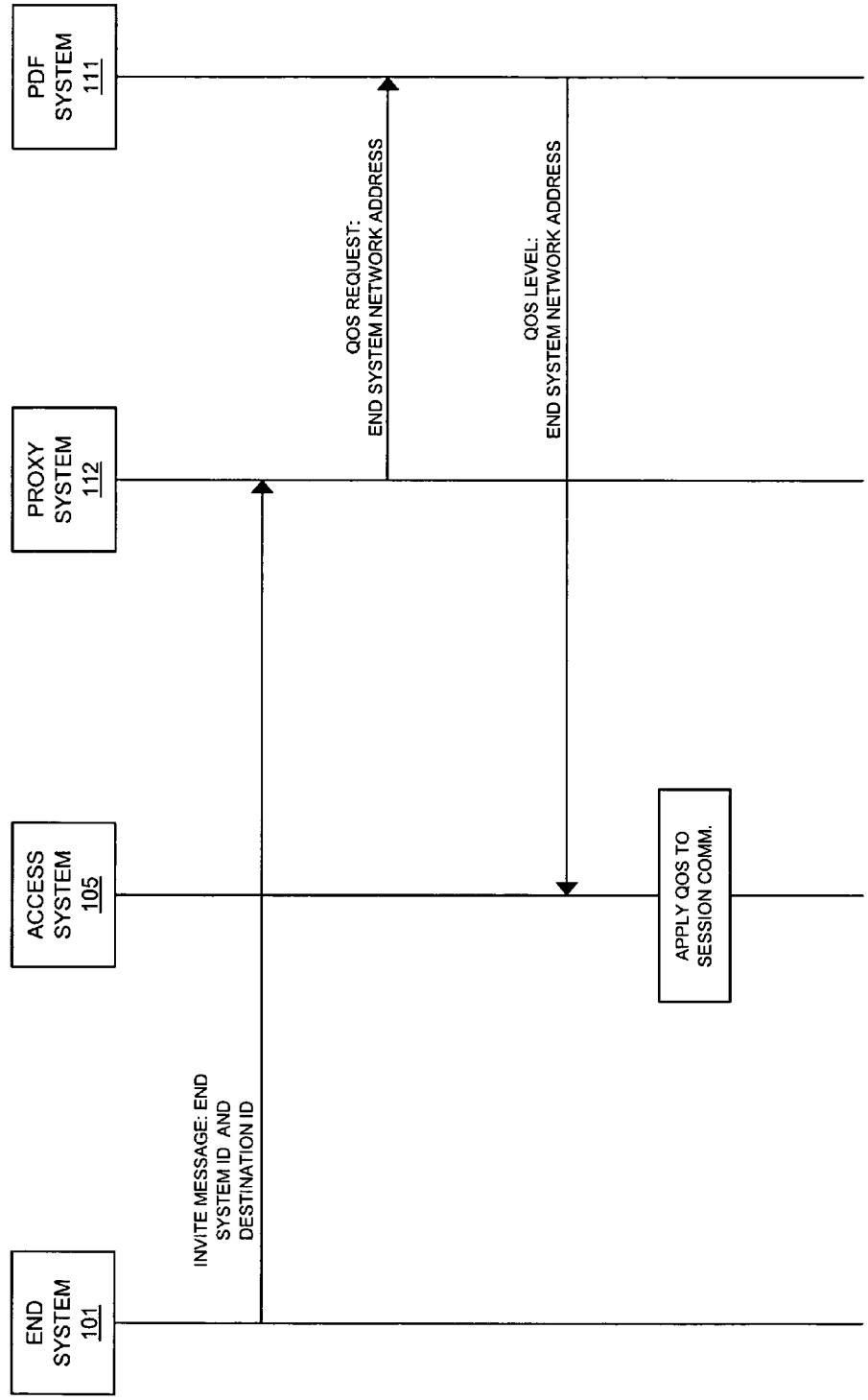
FIG. 2 illustrates a flow diagram in an example of the prior art.
Figure 3:
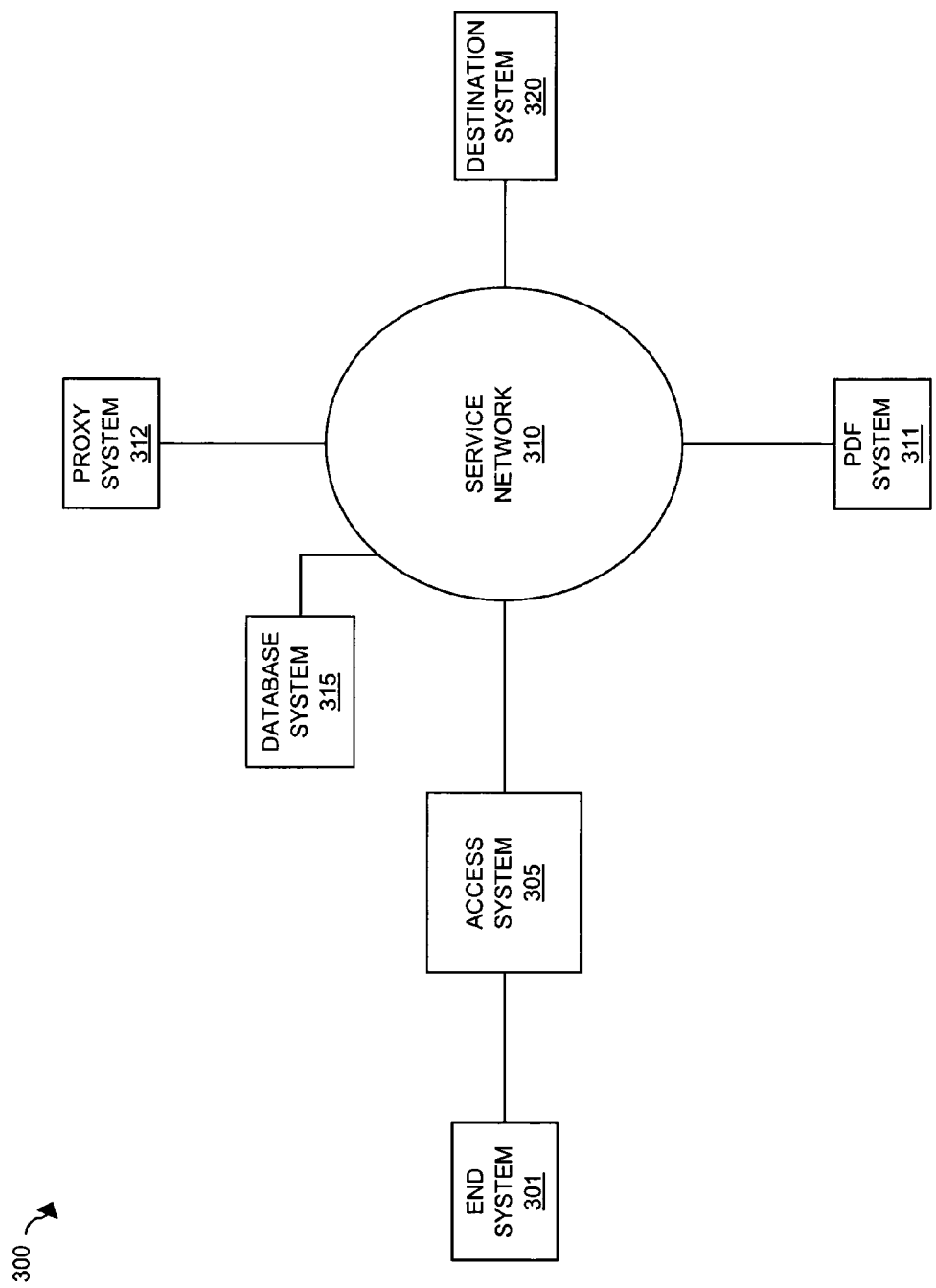
FIG. 3 illustrates a communication network in an embodiment of the invention.
Figure 4:
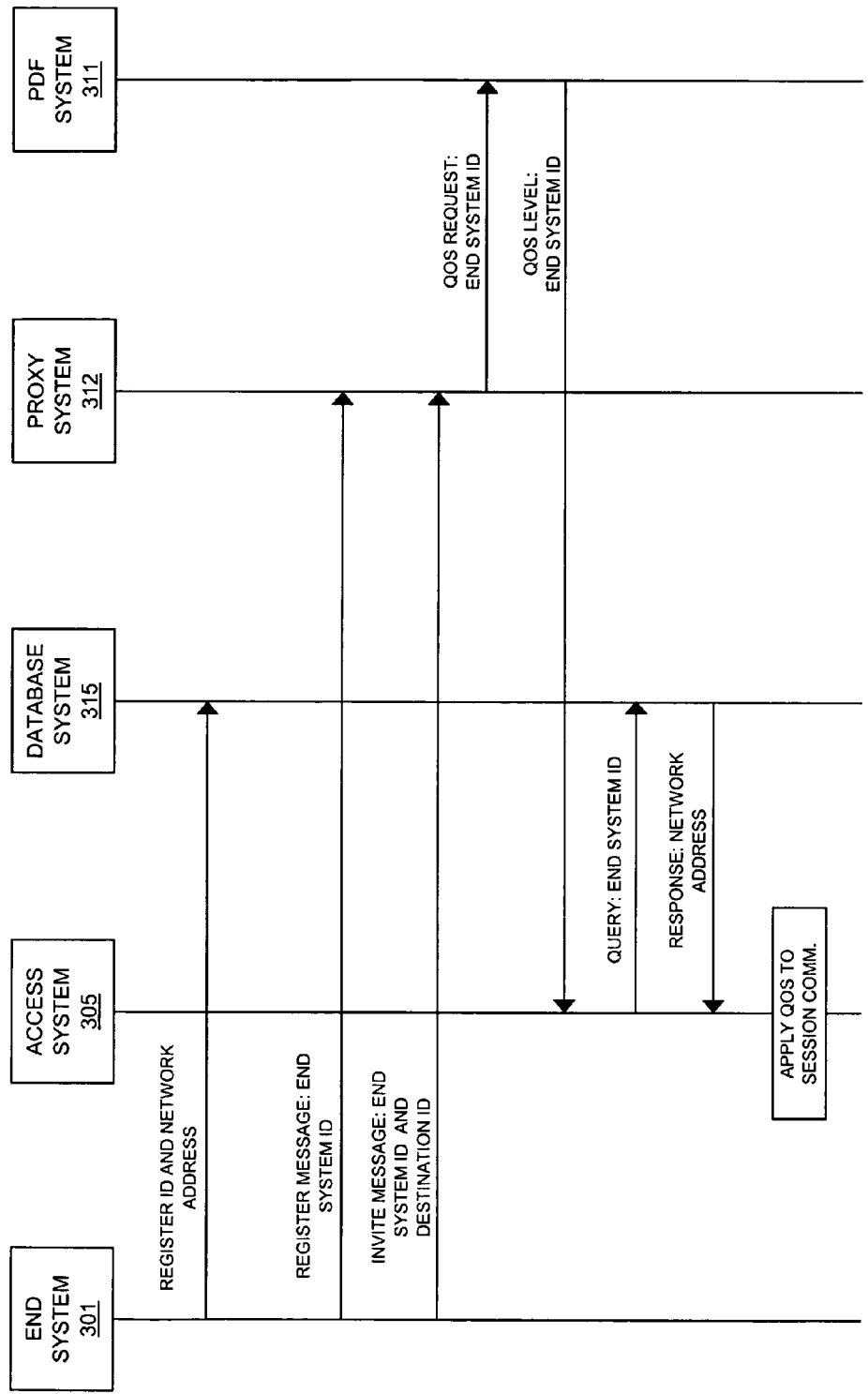
FIG. 4 illustrates a flow diagram in an embodiment of the invention.
Figure 5:
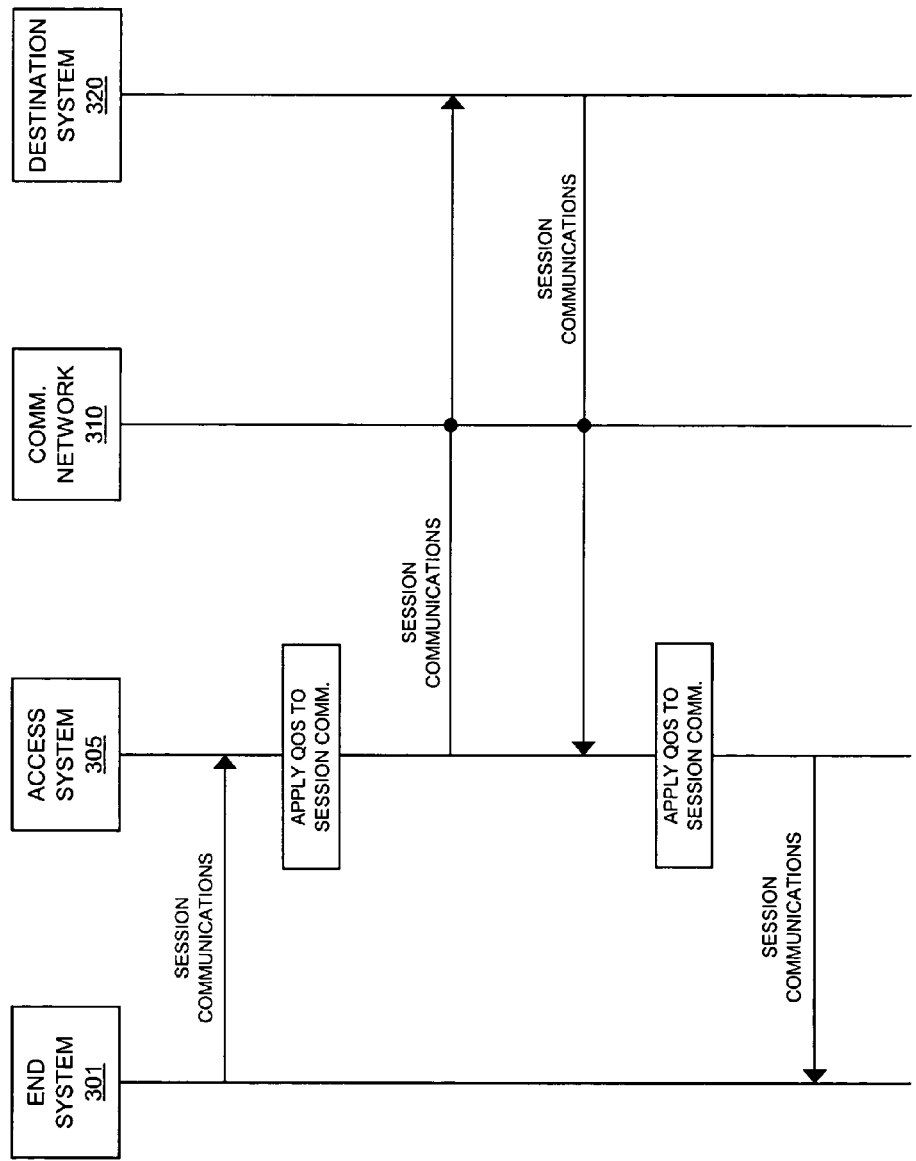
FIG. 5 illustrates a flow diagram in an embodiment of the invention.

First Embodiment Configuration and Operation—FIGS. 3-5

FIG. 3 illustrates communication network 300 in an embodiment of the invention. In this embodiment, the actual network address of an end system may be used by certain network elements, such as an access system, for configuring a session for QoS. Further in this embodiment, an alias identifier may be used by other network elements, such as a proxy system or a PDF system, for determining and informing the access system of the appropriate QoS. A database system is provided for correlating the network address of an end system with the alias identifier for the end system.

In particular, communication network 300 includes service network 310, access system 305, destination system 320, end system 301, proxy system 312, PDF system 311, and database system 315. End system 301 is operatively coupled to access system 305. Access system 305 is operatively coupled to service network 310. Database system 315, proxy system 312, PDF system 311, and destination system 320 are also operatively coupled to service network 310. Service network 310 could be any network or collection of networks configured to provide transport and control for the exchange of communications, such as session bearer and control traffic, as well as other types of communications.

Access system 305 is any system capable of providing service access for end system 301 to service network 310. Access system 305 is also any system capable of providing QoS treatment to service sessions between end system 301 and destination system 320. Examples of service sessions include VoP sessions, video sessions, and gaming sessions, as well as other types of sessions. In one example, access system 305 could be a cable modem termination system (CMTS), as well as other types of access systems.

End system 301 is any system capable of participating as an end system on a session with destination system 320. End system 301 could be a system of collection of systems, such as a wireless or wireline phone, personal digital assistant, multi-media devices, pager, or modem, as well as other types of systems. Destination system 320 could be any system or collection of systems capable of participating with end system 301 on a session.

Proxy system 312 could be any system capable of providing session control for sessions between end system 301 and destination system 320. For instance, proxy system 312 could be capable of communicating with PDF system 311 to determine QoS levels for sessions between end system 301 and destination system 320. Proxy system 312 could be a system or collection of systems. For example, proxy system 312 could be a sub system in a soft-switch. Proxy system 312 could be a stand-alone system separate from a soft-switch. Proxy system 312 could also be considered a soft-switch itself. Other variations are possible. In one example, proxy system 312 could be a SIP proxy server, as well as other types of proxy systems.

PDF system 311 could be any system capable of communicating with proxy system 312 and access system 305 to coordinate and provision QoS for sessions between end system 301 and destination system 320. PDF system 311 could be an individual system or collection of systems.

Database system 315 could be any system capable of storing network addresses in association with alias identifiers. In addition, database system 315 could be any system capable of receiving registration messages indicating network addresses and their associated alias identifiers. Furthermore, database system 315 could be any system capable of receiving and processing queries from access system 305 and transmitting responses back to access system 305.

FIG. 4 is a flow diagram illustrating the operation of communication network 300 in an embodiment of the invention. In this embodiment, QoS is provisioned for a session between end system 301 and destination system 320. To begin, end system 301 registers its alias identifier (ID) and actual network address with database system 315. Next, end system 301 transmits a registration message to proxy system 312 notifying proxy system 312 of the presence of end system 301 and the alias ID of end system 301. Proxy system 312 can then use the information for well known call processing. At this stage, database system 315 holds the current network address for end system 301 and the alias ID for end system 301. The alias ID does not identify the current network address.

After completing the registration process, a user desires to place a VoP call to destination system 320. In response to a user input, such as dialing a phone number, end system 301 transmits an invite message to proxy system 312. The invite message identifies destination system 320, such as by the phone number, as the alias ID of end system 301. Proxy system 312 processes the invited in accordance with well known call processing, including transmitting a QoS request to PDF system 311. However, in a departure from the prior art, the QoS request indicates the alias ID for end system 301, rather than the actual network address.

Upon receiving the QoS request from proxy system 312, PDF system 311 processes the request to determine the appropriate QoS for the requested session between end system 301 and destination system 320. PDF system 311 determines the QoS in accordance with well known principles, such as by performing a table lookup. The lookup could be performed based on a user ID associated with the user using end system 301, the alias ID of end system 301, or the ID of access system 305. Other well known ways of determining the QoS are possible.

After determining the QoS, PDF system 311 transmits a message to access system 305 indicating the QoS and the alias ID for end system 301. Access system 305 receives the message and transmits a query to database system 315 indicating the alias ID. Database system 315 processes the query to determine the network address associated with the alias ID. Upon determining the network address, database system 315 transmits a response to access system 305 indicating the network address associated with the alias ID. Access system 305 is advantageously able to identify session traffic associated with the network address and apply the correct QoS treatment to the session traffic.

FIG. 5 is a flow diagram further illustrating the operation of communication network 300 in an embodiment of the invention. In FIG. 5, a two-way session flow is illustrated, although a session could be one-way. In this embodiment, end system 301 transmits session communications to access system 305. Access system 305, knowing the network address of end system 301, applies the appropriate QoS to the session communications. For instance, access system 305 could provide priority to the session communications in preference over other types of communications, such as non-voice communications. Other types of prioritization are possible. Access system 305 forwards the session communications to communication network 310. Communication network 310 in turn transports the communications to destination system 320.

In the opposite direction, destination system 320 transmits session communications to communication network 310. Communication network 310 transports the communications to access system 305. Access system 305 applies the appropriate QoS to the session communications, and forwards the communications to end system 301. End system 301 provides the communications in a usable form, such as an audio or video output, to a user.

Although not pictured, the following describes the session termination process with respect to FIGS. 3-5. Once the session is concluded, end system 301 transmits a termination message to proxy system 312. Proxy system 312 passes a control message to PDF system 311 indicating the alias ID for end system 301 and instructing PDF system 311 to release access system 305 from the QoS requirements for the session. PDF system 311 responsively transmits a release message to access system 305 to release the session QoS parameters. The release message identifies end system 301 by the alias ID. Access system 305 queries database system 315 with the alias ID to determine the actual network address linked to the alias ID. Database system 315 processes the query and returns the current network address of end system 301 to access system 305. Access system 305 receives the response and clears the QoS requirements associated with the network address. Access system 305 responds to PDF system 311 with a success message. PDF system 311 passes the success message to proxy system 312 to complete the session termination process.

Figure 6:
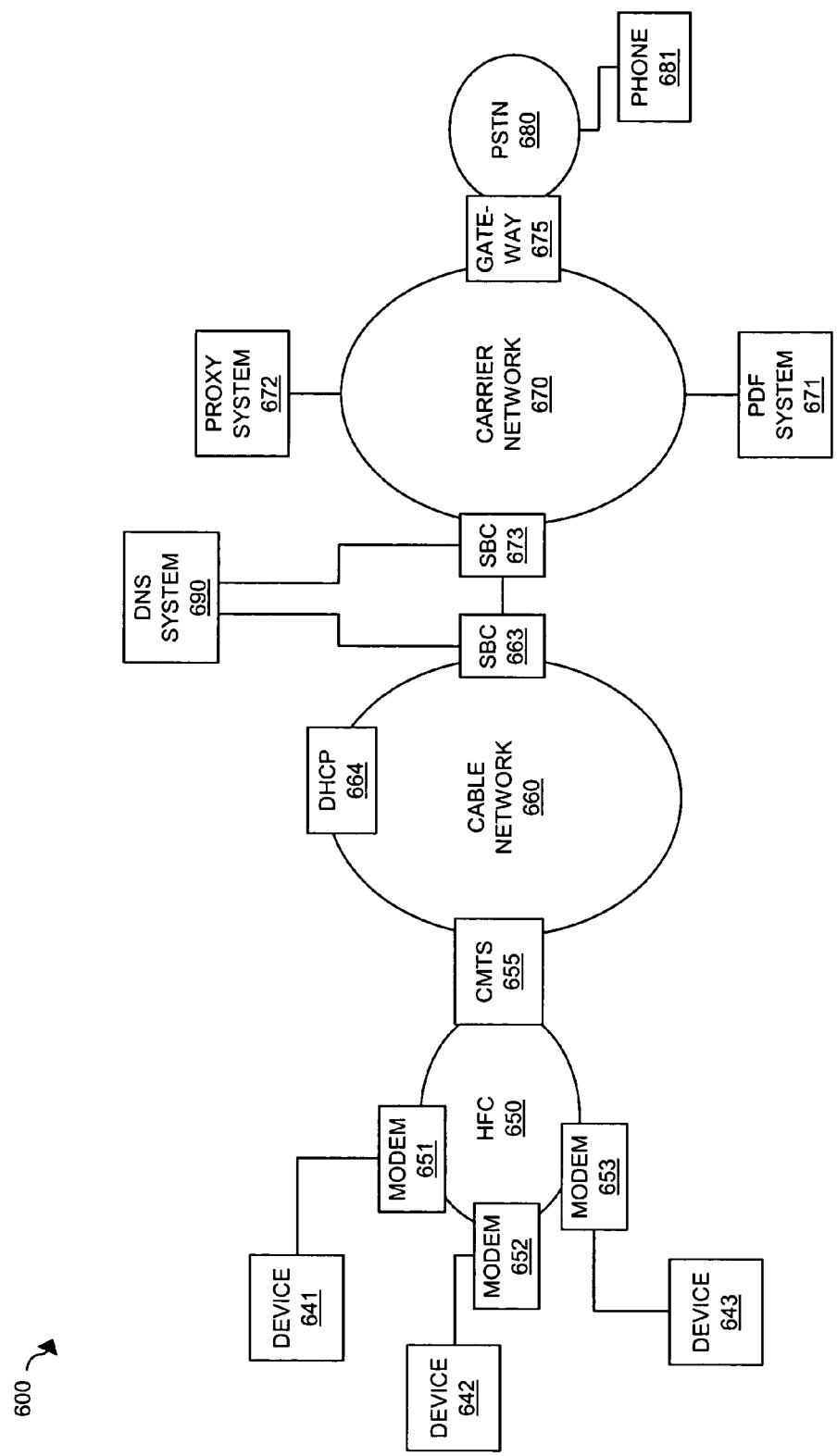
FIG. 6 illustrates a communication network in an embodiment of the invention.
Figure 7:
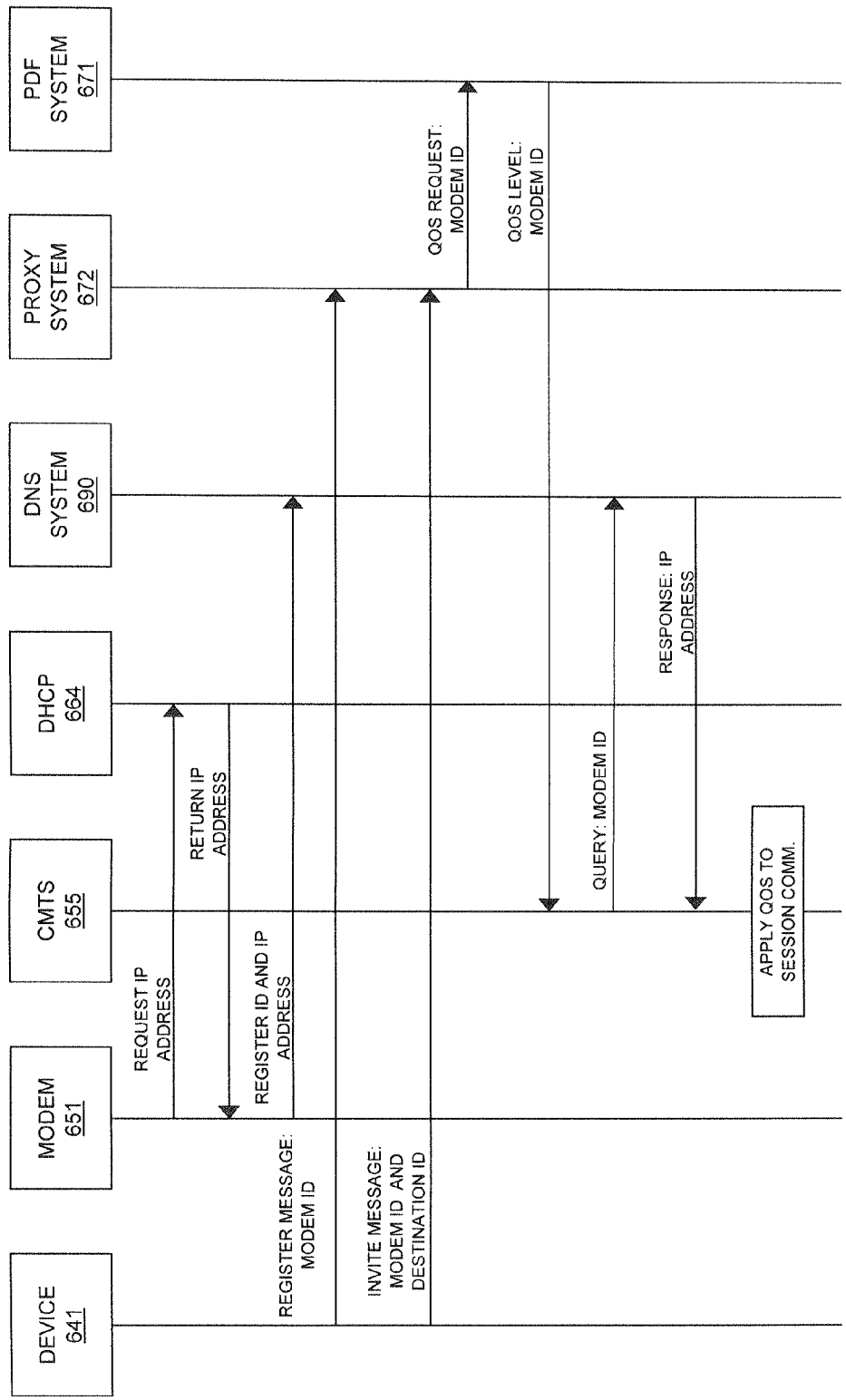
FIG. 7 illustrates a flow diagram in an embodiment of the invention.
Figure 8:
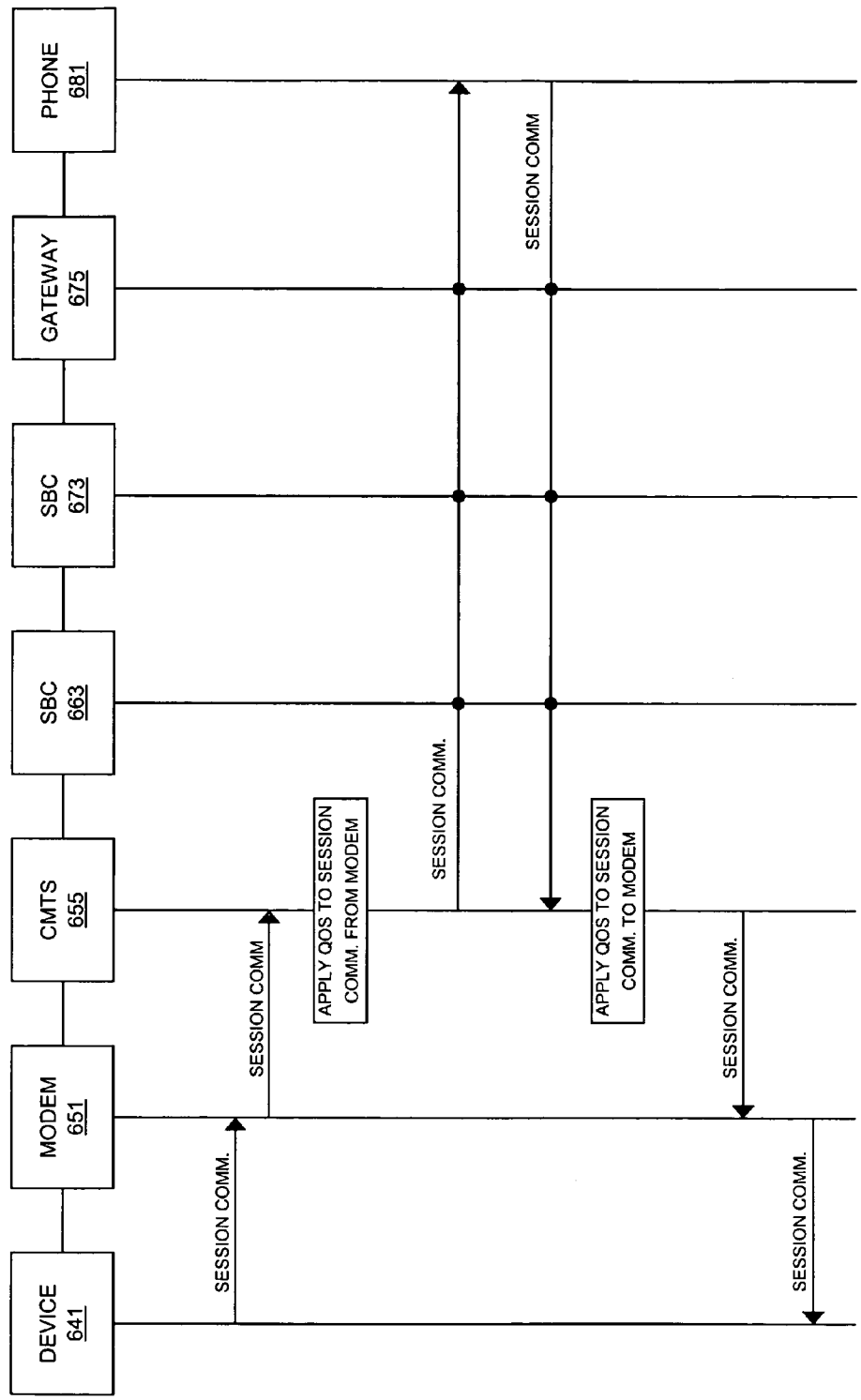
FIG. 8 illustrates a flow diagram in an embodiment of the invention.

Second Embodiment Configuration and Operation—FIGS. 6-8

FIG. 6 illustrates communication network 600 in an embodiment of the invention. In this embodiment, communication network 600 allows a carrier network to retain call control over sessions originating from or terminating to a peered MSO network, even though visibility across the networks is reduced due to the presence of session border controllers. In this embodiment, a modem obtains a dynamic Internet Protocol (IP) address from a dynamic host configuration protocol (DHCP) server. The modem then registers its alias address and its dynamic IP address with a global domain name server. A SIP device connected to the modem registers with a SIP proxy server using the alias address of the modem. Upon initiating a session between the SIP device and a phone on the PSTN, the proxy server communicates with a PDF server using the alias address to configure the session QoS. The PDF server in turn communicates with a cable modem termination system (CMTS) on a cable MSO network using the alias address to provision the QoS. The CMTS queries the global DNS system to resolve the alias address of the modem to its dynamic IP address. The CMTS is then able to identify session traffic from the modem and apply the required QoS.

Communication network 600 includes cable network 660, carrier network 670, PSTN 680, and hybrid fiber coax (HFC) network 650. Devices 641, 642, and 643 are operatively coupled to modems 651, 652, and 653 respectively. Modems 651, 652, and 653 are operatively coupled by HFC 650 to CMTS 655. Cable network 660 operatively couples CMTS to session border controller (SBC) 663. SBC 663 is operatively coupled to SBC 673. Proxy system 672, PDF system 671, and gateway 675 are operatively coupled together by carrier network 670 and to SBC 673. Gateway 675 operatively couples carrier network 670 to PSTN 680. Phone 681 is coupled to PSTN 680. DNS system 690 is in communication with cable network 660 and carrier network through SBCs 663 and 673 respectively.

Cable network 660 could be any network typical of MSO networks. For example, cable network 600 could be a high-speed Gig-Ethernet network. HFC network 650 could be comprised of fiber links, coaxial cable links, or both. Devices 641, 642, and 643 could be any kind of device capable of communicating with modems 652, 652, and 653. For example, devices 641, 642, and 643 could be computers, phones, or other types of devices. CMTS 655 could be capable of delivering data services over HFC 650 to modems 651, 652, and 653. More particularly, CMTS 655 could be configured to provide QoS for services in accordance with the packet cable multimedia (PCMM) specification. CMTS 655 could communicate with modems 651, 652, and 653 over DOCSIS 1.1 or 2.0 links, as is well understood in the art.

SBC 663 could be any session border controller capable of controlling session traffic across the border between cable network 660 and carrier network 670. Similarly, SBC 673 could be any session border controller capable of controlling session traffic across the border between cable network 660 and carrier network 670. Carrier network 670 could be any network capable of providing VoP services to end users of cable network 660. Carrier network 670 could be, for example, a packet core network capable of terminating sessions to or from cable network 660 and to or from PSTN 680. Gateway 675 could be any gateway system capable of interfacing between carrier network 670 and PSTN 680. Gateway 675 could be capable of interworking both bearer traffic and signaling traffic.

Proxy system 672 could be any system capable of providing call control for sessions originating from and terminating to end users in cable network 660. For example, proxy system 672 could be a SIP proxy configured to provide call control for SIP VoP sessions originating from or terminating to devices 641, 642, and 643. In another example, proxy system 672 could be configured to communicate with PDF system 671 to determine session QoS levels for individual sessions. SIP proxies are well known in the art. Proxy system 672 could also be referred to as a soft switch. Proxy system 672 could also be integrated into a soft switch. Alternatively, proxy system 672 could be a stand alone element separate from a soft switch.

PDF system 671 could be any system capable of communicating with proxy system 672 and CMTS 655 to provision session QoS. PDF system 671 could be configured to operate in accordance with the common open policy service (COPS) protocol. COPS is a standard for exchanging policy information in order to support dynamic QoS in IP networks. In this case, PDF system 671 could be considered a policy decision point (PDP), whereas CMTS 655 could be considered a policy enforcement point (PEP).

FIG. 7 is a flow diagram illustrating the operation of communication network 600 in an embodiment of the invention. To begin, modem 651 is powered on and automatically transmits an address request to DHCP server 664. DHCP server 664 returns a dynamic IP address to modem 651. Next, modem 651 registers the dynamic IP address and its hard-coded DNS name with DNS system 690. The hard-coded DNS name of modem 561 could identify a phone number for the modem, the cable MSO that operates cable network 660, and a region of the cable network in which modem 651 resides. For instance, the hard-coded address could be 7855551212.cablemso.region22. Other aliases could be used.

Next, a user using VoIP enabled device 641 desires to place a call to phone 681 on PSTN 680. In response, device 641 transmits a SIP invite message to proxy system 672. The invite message could identify the hard-coded modem address or ID and a destination ID for phone 681. The destination ID could be, for example, a PSTN phone number. In response to the invite message, proxy system 672 performs call setup for the session, including transmitting a QoS request to PDF system 671. In one example, proxy system 672 uses a SOAP/XML interface to pass along the session description protocol (SDP) information from the original invite message to PDF system 671. The original SDP information includes the hard-coded modem address.

The PDF request indicates the hard-coded modem address. PDF system receives the QoS request and determines a QoS level for the session involving modem 651, as identified by the hard-coded modem address. PDF system 671 transmits a quality message to CMTS 655 indicating the hard-coded modem address and the QoS level. PDF system 671 could communicate with CMTS 655 in accordance with COPS based PCMM. CCMTS 655 receives the quality message and queries DNS system 690 with the hard-coded modem address. DNS system 690 processes the query, including performing a look-up to a table based on the hard-coded modem address. DNS system 690 returns a response indicating the dynamic IP address stored in association with the hard-coded modem address. CMTS 655 then uses the dynamic IP address to identify and configure a network path for the session traffic according to the specified QoS level. Once the QoS levels have been set, CMTS 655 transmits a success message to PDF system 671. PDF system 671 passes the success message to proxy system 672 and the session is allowed to proceed.

FIG. 8 is a flow diagram illustrating the flow of session traffic during a VoP session in communication network 600. In one direction, device 641 transfers session traffic, such as voice data, to modem 651. Modem 651 transfers the traffic to CMTS 655. CMTS 655 applies the appropriate QoS, such as by prioritizing the VoP traffic over other types of non-VoP traffic. CMTS 655 then transmits the traffic to SBC 663. SBC 663 recognizes the session traffic and passes it to SBC 673. SBC 673 has been configured by proxy system 672 to route the traffic over carrier network 670 to gateway 675. Gateway 675 interworks the traffic from an asynchronous packet format to a time division multiplexed (TDM) format suitable for transport over PSTN 680 to phone 681.

In the opposite direction, session traffic, such as voice communications, is transferred from phone 681 to PSTN 680. PSTN 680 routes the traffic to gateway 675. Gateway 675 interworks the traffic from a TDM format to an asynchronous packet format suitable for transport over carrier network 670 to SBC 673. SBC 673 has been configured by proxy system 672 to route the traffic to SBC 663. Likewise, SBC 663 has been configured to route the traffic to CMTS 655. CMTS 655 applies the appropriate QoS levels to the session traffic and forwards the traffic over HFC 650 to modem 651. Modem 651 then provides the session traffic to device 641. Device 641 plays out the traffic in an audio or video form suitable for a user.

The following describes the call process that occurs at the conclusion of the session. To conclude the session, end device 641 transmits a bye message to proxy system 672. Using the SOAP/XML interface, proxy system 672 transmits the SDP information from the original invite message, including the hard-coded modem address, to PDF system 671. Proxy system 672 also sends a request to PDF system 671 to release the QoS handling for the session. PDF system 671 receives the release request and sends a release request to CMTS 655 to release the QoS requirements. The release request indicates the hard-coded modem address for modem 651. CMTS 655 again queries DNS system 690 to resolve the hard-coded modem address to its current dynamic IP address. Upon receiving the dynamic IP address from DNS system 690, CMTS 655 clears the appropriate QoS gates on the data streams associated with the dynamic IP address and responds with a success message to PDF system 671. PDF system 671 communicates the success message to proxy system 672, and the call is successfully terminated.

Advantageously, communication network 600 allows carrier network 670 to retain call control over sessions originating from and terminating to cable network 660 even though visibility across the networks is reduced by the presence of session border controllers.

What is claimed is:

1. A communication system comprising:
   a modem coupled to a cable modem termination system;
   a device coupled to the modem configured to transmit an alias and a dynamic Internet Protocol (IP) address for the modem to a database, and to transmit an invite message for a session, wherein the alias identifies the device and not the dynamic IP address of the modem, and the invite message indicates a destination and the alias;
   a proxy system configured to receive the invite message and transfer a quality request wherein the quality request indicates the alias;
   a policy system configured to receive the quality request, determine a quality level for the session and transmit a quality message to the cable modem termination system indicating the alias and the quality level; and
   the cable modem termination system configured to receive the quality message, transmit a query to the database indicating the alias, receive the dynamic IP address for the modem in response to the query, identify traffic for the session using the dynamic IP address for the modem, and apply the quality level to the traffic.

2. The communication system of claim 1 wherein the session comprises a voice over Internet Protocol (VoIP) session.

3. A method of operating a communication system, the method comprising:
   transmitting an alias and a dynamic Internet Protocol (IP) address for a modem from a device coupled to the modem to a database, wherein the alias identifies the device and not the dynamic IP address of the modem;

transmitting an invite message for a session from the device coupled to the modem to a cable modem termination system, wherein the invite message indicates a destination and the alias for the device;

receiving the invite message in a proxy system and transferring a quality request from the proxy system wherein the quality request indicates the alias;

receiving the quality request in a policy system, determining a quality level for the session, transmitting a quality message to the cable modem termination system indicating the alias and the quality level; and receiving the quality message in the cable modem termination system, transmitting a query to the database indicating the alias, receiving the dynamic IP address for the modem in response to the query, identifying traffic for the session using the dynamic IP address for the modem, and applying the quality level to the traffic.

4. The method of claim 3 wherein the session comprises a voice over Internet Protocol (VoIP) session.

\* \* \* \* \*